United States Patent [19]

Reich

[11] Patent Number: 5,235,932

[45] Date of Patent: Aug. 17, 1993

[54] SUBMERSIBLE DOCK AND DUMP MECHANISM

[75] Inventor: Ronald S. Reich, Ramona, Calif.

[73] Assignee: The United States of America as represented by the Secretary of the Navy, Washington, D.C.

[21] Appl. No.: 805,439

[22] Filed: Dec. 11, 1991

[51] Int. Cl.⁵ .................. B63G 8/41; B63C 11/10
[52] U.S. Cl. ............................ 114/322; 114/328; 114/50; 405/188
[58] Field of Search ........... 114/312, 322, 328, 144 R, 114/146; 405/188, 189; 367/2, 4, 19, 191; 340/850; 359/141

[56] References Cited

U.S. PATENT DOCUMENTS

| | | | |
|---|---|---|---|
| 3,713,414 | 1/1973 | Wischhoefer et al. | 114/50 |
| 3,757,722 | 9/1973 | Seiple | 114/16 |
| 3,986,745 | 10/1976 | Langguth | 114/55 X |
| 3,987,741 | 10/1976 | Tryon | 114/16 R |
| 4,010,619 | 3/1977 | Hightower et al. | 114/16 R |
| 4,516,227 | 5/1985 | Wener et al. | 367/15 |
| 4,557,697 | 10/1985 | Kontar et al. | 441/2 |
| 4,799,825 | 1/1989 | Meyerhoff et al. | 405/188 |

Primary Examiner—David H. Brown
Attorney, Agent, or Firm—Harvey Fendelman; Thomas Glenn Keough

[57] ABSTRACT

Mechanically cooperating assemblies on an undersea vehicle and an instrumentation target assure the making of a rigid coupling for passing electrical, optical or fluid information between the vehicle and the instrumentation and reduce the complexity of such a coupling from a three-dimensional to a two-dimensional maneuver by the vehicle. An undersea vehicle locates a pair of spaced-apart vertical cables which are attached to an instrumentation target assembly and engages them anywhere along their length with a converging grabber assembly mounted on the forward moving underwater vehicle. After engaging the cables, the grabber assembly merely slides along the cables toward the instrumentation target assembly. When the grabber assembly is nested in the instrumentation target assembly, a rigid attachment therewith is achieved by merely retracting the grabber arm assembly to pull appropriately located mating electrical, optical or fluid information connectors together to effect a coupling since a proper alignment is guaranteed by the mating configurations of the assemblies.

6 Claims, 6 Drawing Sheets

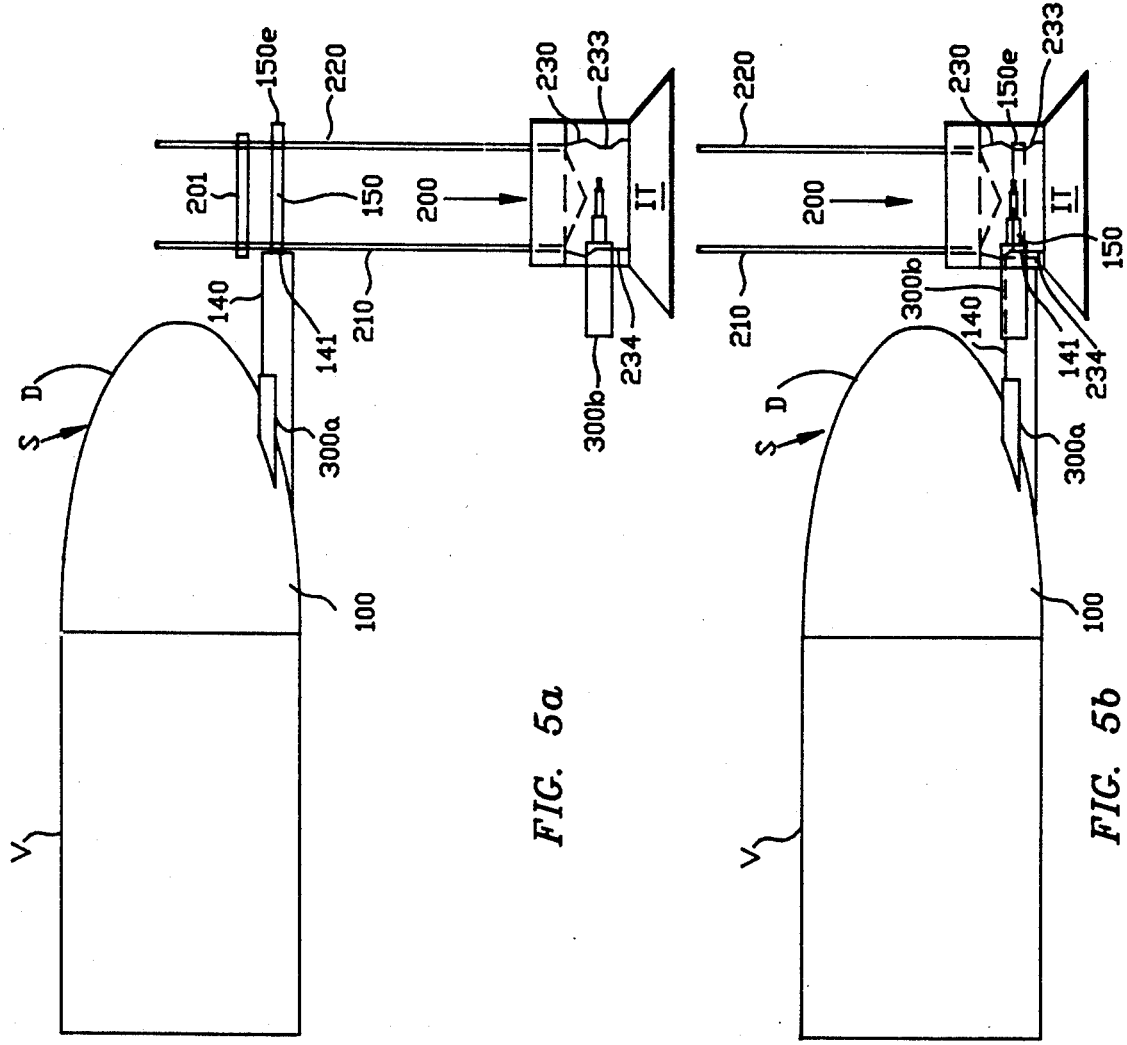

SUBMERSIBLE DOCK AND DUMP MECHANISM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Existing methods of docking an underwater vehicle for the interconnection of optical, electrical or fluid information conduits involve the maneuvering of the vehicle into a self-centering conical target which usually is hard mounted. This maneuvering process requires intricate three-dimensional positioning plus compensation for rotational tendencies of the vehicle to ensure perfect alignment for a subsequent interconnection. The contemporary docking mechanisms generally fail to provide for a gentle attachment to the instrumentation target and which assures the proper positioning for a required undamaged rigid interconnection. The contemporary mechanisms have been shown to be lacking in method and apparatus of attaching to an instrumentation target in such a way as to permit a reliable transfer of electrical, optical or fluid data from the instrumentation target via the underwater vehicle.

Thus, a continuing need exists in the state of the art for a mechanism which allows an underwater vehicle to attach to an instrumentation target and then position itself such that a rigid interconnection can be made for the purpose of passing electrical, optical or fluid information via the underwater vehicle.

SUMMARY OF THE INVENTION

The present invention is directed to providing electrical, optical or fluid information communications between an instrumentation target and an underwater vehicle by means of reducing the task from a three-dimensional challenge to a two-dimensional one. An undersea vehicle locates a pair of spaced-apart vertical cables which are attached to an instrumentation target assembly and engages them anywhere along their length with a converging grabber assembly mounted on the forward moving underwater vehicle. After engaging the cables, the grabber assembly merely slides along the cables toward the instrumentation target assembly. When nested in the instrumentation target assembly, a rigid attachment therewith is achieved by merely retracting the grabber arm assembly to pull strategically located mating electrical, optical or fluid information connectors together to effect an automatic positive coupling since a proper alignment is guaranteed by the mating configurations of the assemblies.

An object of the invention is to provide a mechanism for making a rigid connection between an undersea vehicle and an instrumentation target for the transfer of information therebetween.

Another object is to provide a mechanism adaptable for underwater vehicles which reduces the interconnection task from a three-dimensional challenge to a two-dimensional one.

Yet another object is to provide a mechanism suitable for an underwater vehicle that accommodates a pair of cables to reduce maneuvering to a two-dimensional consideration.

Still another object is to provide a mechanism adaptable to an underwater vehicle that assures a rigid interconnection and a transfer of electrical, optical or fluid information therebetween.

These and other objects of the invention will become more readily apparent from the ensuing specification and drawings when taken in conjunction with the appended claims.

BRIEF DESCRIPTION OF THE DRAWINGS

FIG. 5a is a cross-sectional side view of the grabber assembly with the tines of the pair of grabber arms closed about the vertical cables as the submersible vehicle begins to slide downward toward the target assembly of the instrumentation target.

FIG. 5b shows a cross-sectional view of the grabber assembly and the instrumentation target assembly as they are nestled together, completely captured by the grabber arm assembly, with the coupling of a data conduit.

DESCRIPTION OF THE PREFERRED EMBODIMENT

Figure 1:
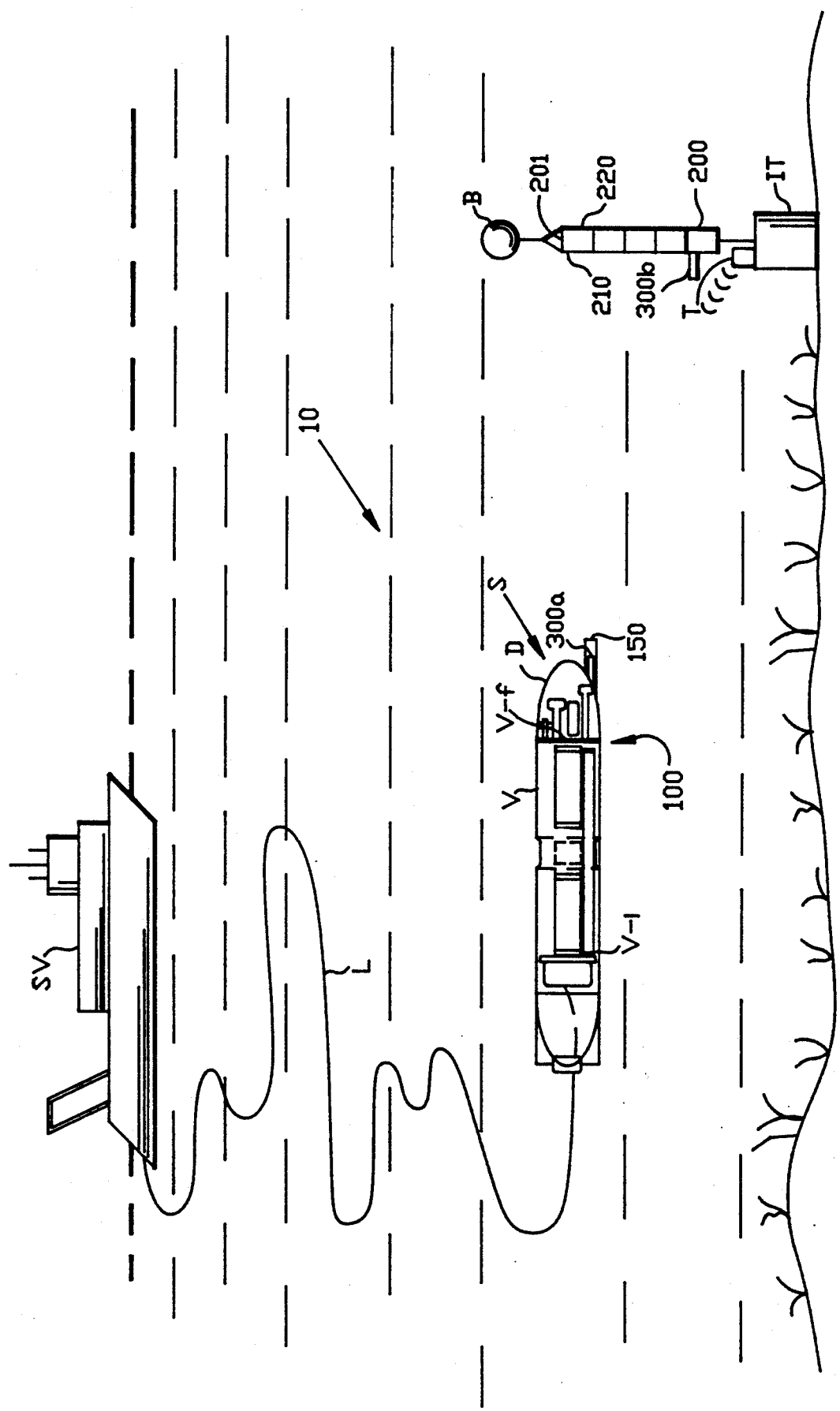
FIG. 1 shows the grabber assembly shown in its retracted position and mounted on a submersible vehicle approaching an instrumentation target.

Referring to FIG. 1, a dock and dump system 10 includes a grabber arm assembly 100 mounted on a manned or unmanned submersible vehicle V and an instrumentation target assembly 200 mounted on an undersea instrumentation target IT to allow the providing or electrical, optical or fluid (data transfer) information communications between the instrumentation target and the vehicle. A submerged or surface vessel SV optionally has a command and control line L connected to submersible vehicle V which can be used to transport command and control information as well as power for the submersible. Line L can be dispensed with when a submersible vehicle is selected to have the necessary power supplies, guidance mechanisms and other operational support equipments onboard and relies on an acoustic or optical telemetry link or has been preprogrammed for autonomous operation. In accordance with choice of the vehicle design which has been made, appropriate transducer and transponder beacons are provided for acoustic, optical, low frequency, etc., communications to and from submersible vehicle V to responsively direct it to an instrumentation target package IT. The instrumentation target package may be provided with acoustic and/or visual target transponders that, upon the receipt of the proper interrogation, emits a response to reveal its location so that submersible vehicle V can be maneuvered to within at least a visual acquisition range from TV cameras and other sensors S carried inside of or adjacent to a transparent dome D on the submersible vehicle. Once the instrumentation target package is brought within a sphere of acoustic or visual observation of the submersible vehicle, then personnel onboard surface vehicle SV have the option to take control of the vehicle and appropriately direct it to engage a grabber assembly 100 on the forward part of the vehicle with a docking or target assembly 200 which is mounted on or above instrumentation target IT.

A remotely located operator on surface vessel SV, or, in the case of an self-controlled autonomous submersible vehicle V, a preprogrammed onboard computer instruction sequence, maneuvers submersible vehicle V as it approaches instrumentation target IT. The maneuvering aligns the vehicle with a pair of spaced-apart cables 210 and 220 that are buoyed-up by an interconnected submerged buoy B to extend from target assembly 200. As shown in FIG. 1, small rigid spacers 201 may be included between the cables to maintain their spatial separation if desired.

The engagement mechanism, to be described in detail below, is made up of grabber arm assembly 100 and docking or target assembly 200 that rely on a predetermined mutual mechanical cooperation to enable the mating interconnection of a male body connector 300a carried on vehicle V next to grabber arm assembly 100 and a female body connector 300b mounted immediately adjacent target assembly 200 on instrumentation target IT. The male body connector and the female body connector can be fabricated to provide for a rigid electrical, optical or fluid interconnection between the surface vehicle and the instrumentation target via vehicle V to provide for a variety of communication schemes. For example, in addition to establishing a conventional continuous communications link, the instrumentation target could function as a transponder, if desired, to initiate a remote actuation of intended instrumentation.

Referring once again to FIG. 1, grabber arm assembly 100 is, for the most part, internally carried in submersible vehicle V up to the time when it is extended to engage the target assembly 200 for interconnection of the male and female connectors 300a and 300b. The constituents of the grabber arm assembly in this position are set forth in greater detail in FIGS. 2 and 3, which shows that grabber arm assembly 100 is rigidly mounted to inner bulkhead V-i via a suitably welded, brazed or bolted flange 101. A stepping motor 110 is mounted on the flange and is provided with sufficient control leads, not shown, to impart a selective bidirectional rotation to a motor shaft 111. A coupling 112 is secured onto shaft 111 and may be a magnetic coupling so that over-rotation of the motor in one direction or the other does not damage the other elements which are operatively associated with a lead screw 115.

Lead screw 115 serves to translate selective bidirectional rotational motion to outward and inward extensions of an inner arm 125 and an outer arm 140 along with a pair of grabber arms 150 as well as the selective opening and closing of the pair of grabber arms as they engage cables 210 and 220 shown in FIG. 1. The opposite end of lead screw 115 is supported by a bushing 120, which is sized and constructed of a suitable material for slidable motion within inner arm 125 of the grabber arm assembly, note also FIGS. 2 and 3.

Inner arm 125 is rigidly attached at a threaded junction 126a with a follower nut 126. Follower nut 126 also is machined to have an appropriately sized threaded bore 126b which mates with the threads on lead screw 115 so that the displacements of the inner and outer arms are imparted by the follower nut as the screw is rotated.

Figure 3:
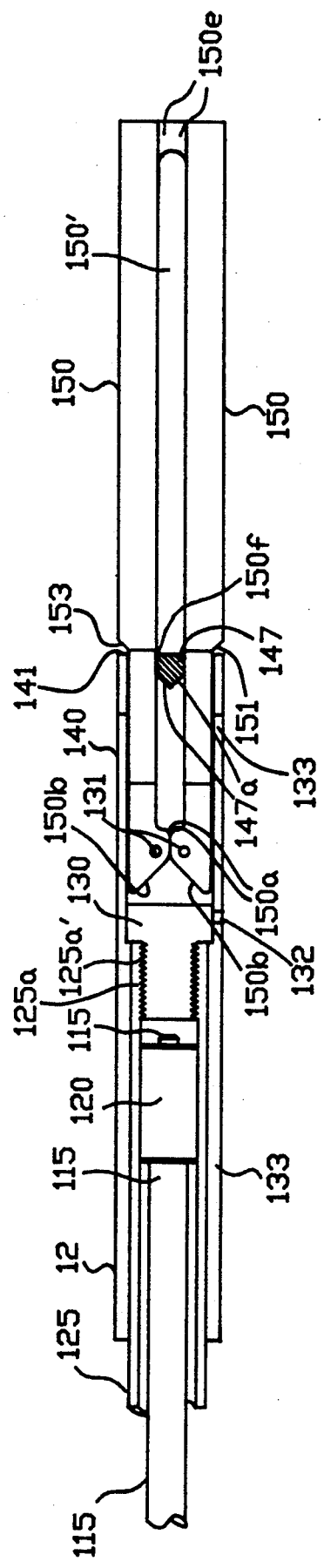
FIG. 3 is a cross-sectional side view of some of the details of the grabber assembly with the pair of grabber arms in the retracted position.
Figures 4, 4A:
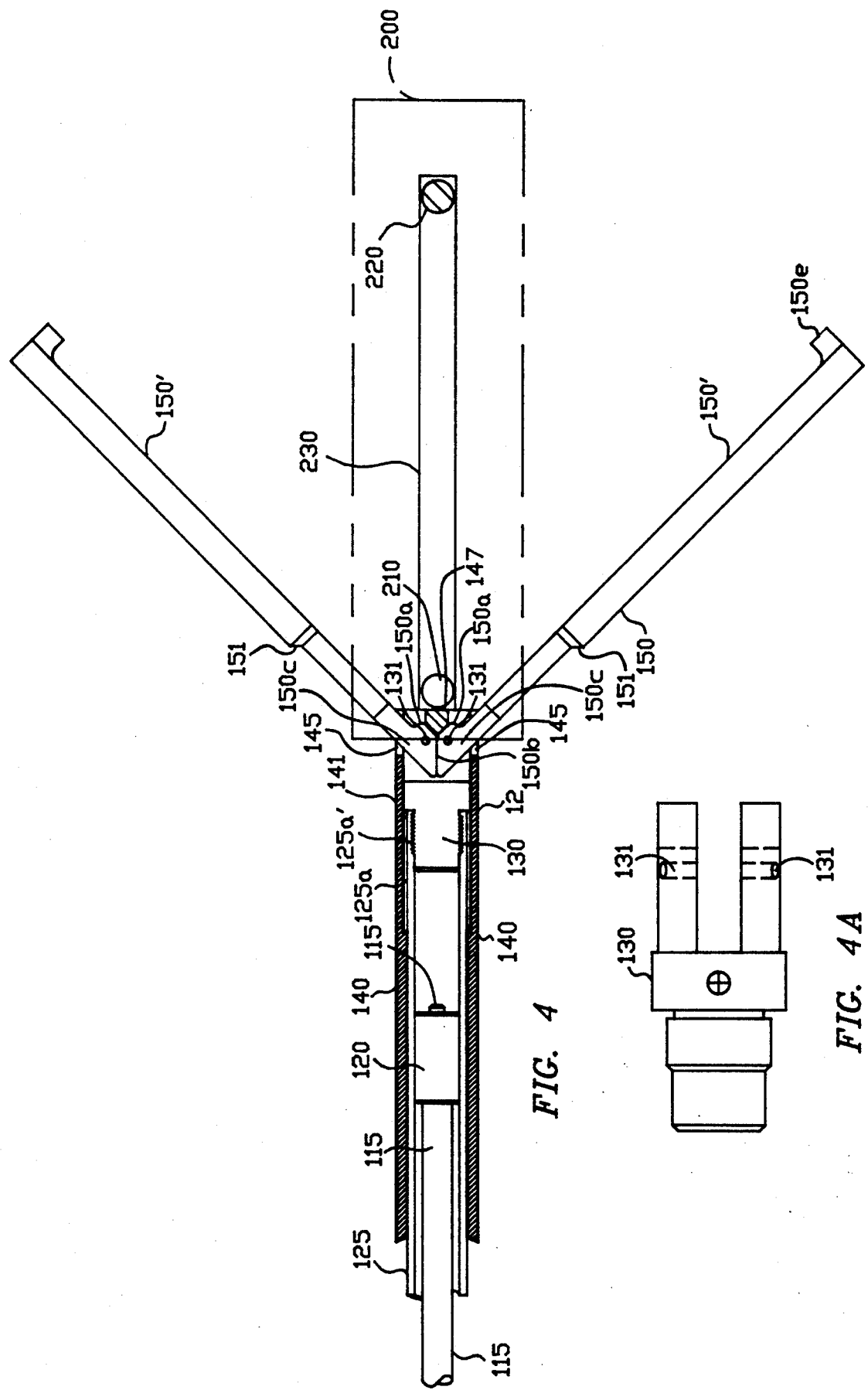
FIG. 4 shows the pair of grabber arms of a grabber arm assembly in an open position receiving and about to engage the two vertical wire cables extending from a target assembly of an instrumentation target.
FIG. 4a depicts details of the clevis which is rotated ninety degrees from its orientation shown in FIG. 4.

Noting FIG. 3, an inner end 125a of inner arm 125 is rigidly attached via a threaded junction 125a' to a clevis 130 which is pivotally attached to pair of grabber arms 150 via a pair of pins 131. The clevis is retained from rotary motion inside the grabber arm assembly by a laterally extending clevis pin 132 which reaches through an appropriately shaped slot 133 provided in outer arm 140, see FIG. 4.

Figure 2:
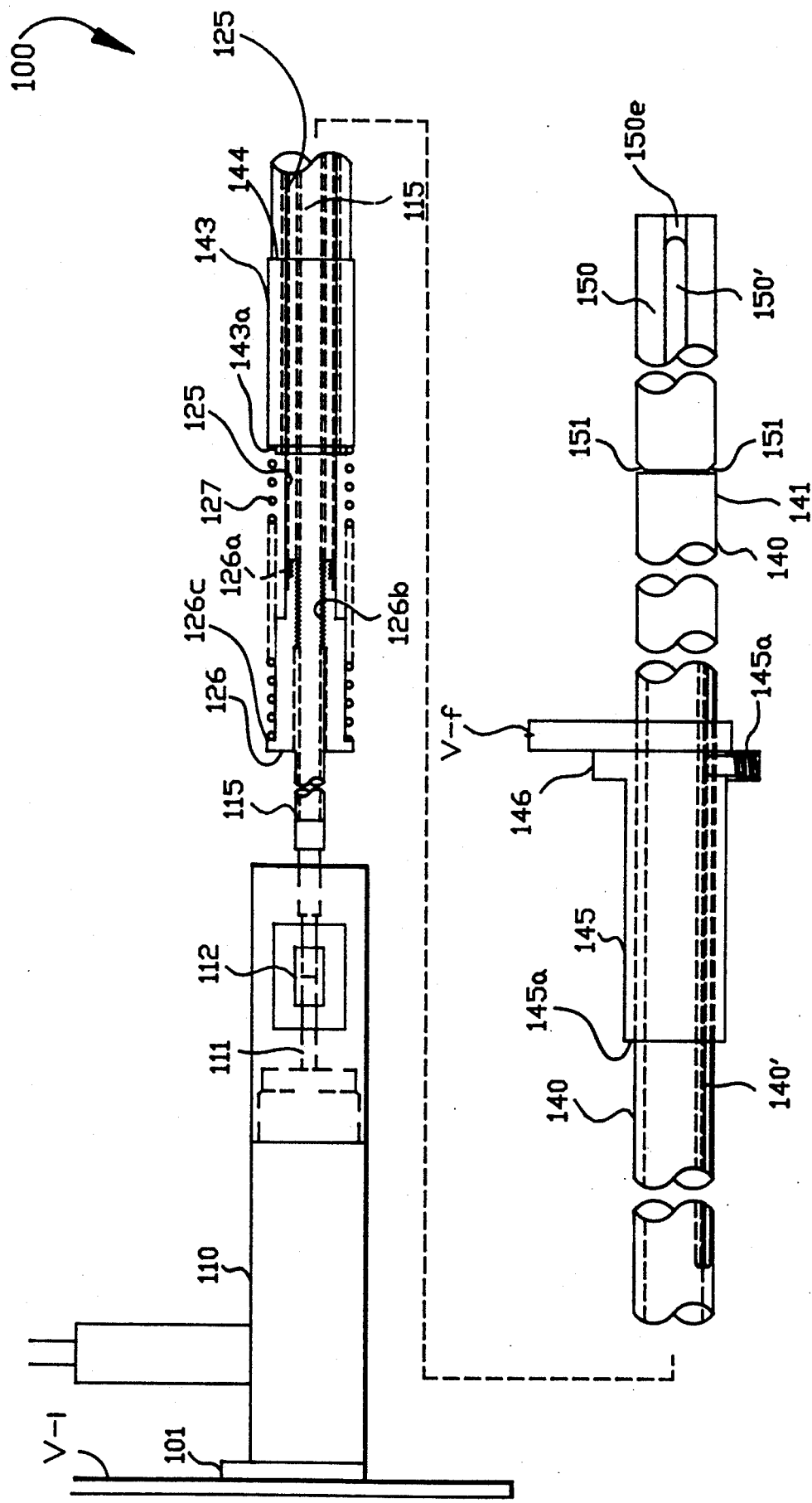
FIG. 2 is side view, partially in cross section of the grabber assembly with the pair of grabber arms in the retracted position.

Looking to FIG. 2, outer arm 140 is provided with a sufficient internal diameter to slidably contain inner arm 125. Outer arm 140 is itself slidably supported by a flange bushing 145 provided with a mounting flange 146 that is suitably attached to a forward bulkhead V-f of submersible vehicle V. Flange bushing 145 is provided with a detent screw 145a that is sized to slidably fit into a longitudinal slot 140' in outer arm 140 to prevent rotation of the outer arm. The slidable support of outer arm 140 by flange bushing 145 allows the inward and outward displacements of grabber arm assembly 100 before, during and after engagement of cables 210 and 220. Outer arm 140 is sandwiched between shoulders 151 of pair of grabber arms 150 at an outer end 141 of outer arm 140 and a compression spring 127 which abuts and is positioned around follower nut 126 at a surface 143a of an inner end 143 of outer arm 140.

Rotation of stepper motor 110 in one direction causes an appropriate rotation of lead screw 115 and a consequent longitudinal, axial displacement of follower nut 126 toward bulkhead V-f. This traversal carries compression spring 127, outer arm 140 and inner arm 125 toward and through flange bushing 145 to extend grabber arm 150 beyond the nose or dome D of submersible vehicle V. When a shoulder 144 of end portion 143 of outer arm 140 contacts a shoulder 145a of bushing 145, compression spring 127 is compressed as lead screw 115 continues to rotate and grabber arms 150 are longitudinally, axially displaced to extend relative to outer arm 140.

Further, continuous rotation of lead screw 115 causes a continuing right displacement of follower nut 126 so that compression spring 127 is compressed between shoulder 126c of follower nut 126 and an inner shoulder 143a of inner portion 143 of outer arm 140. This causes a mechanical interaction between a wedge block 147 and cam lobes 150a of pair of grabber arms 150

Wedge block 147 is rigidly mounted on a distal end of outer arm 140. The wedge block is located to be interposed between grabber arms 150 in what is defined as a grabber arm slot 150' when the grabber arms are in the closed position with tines 150e overlapping as shown in FIGS. 2 and 3. Both of the grabber arms are provided with a cam lobe 150a, both which are appropriately configured to cause the grabber arms to rotate about pins 131 when camming surfaces 147a of wedge block 147 are forced against camming lobes 150a. An angle of separation of the two grabber arms 150 is limited by the angle of sloped ends 150b after camming surfaces 147a of wedge block 147 separates the grabber arms. This position, shown in FIG. 4, now represents the fully open position when grabber arm assembly 100 is ready to approach the docking or target assembly 200.

Figures 6, 7:
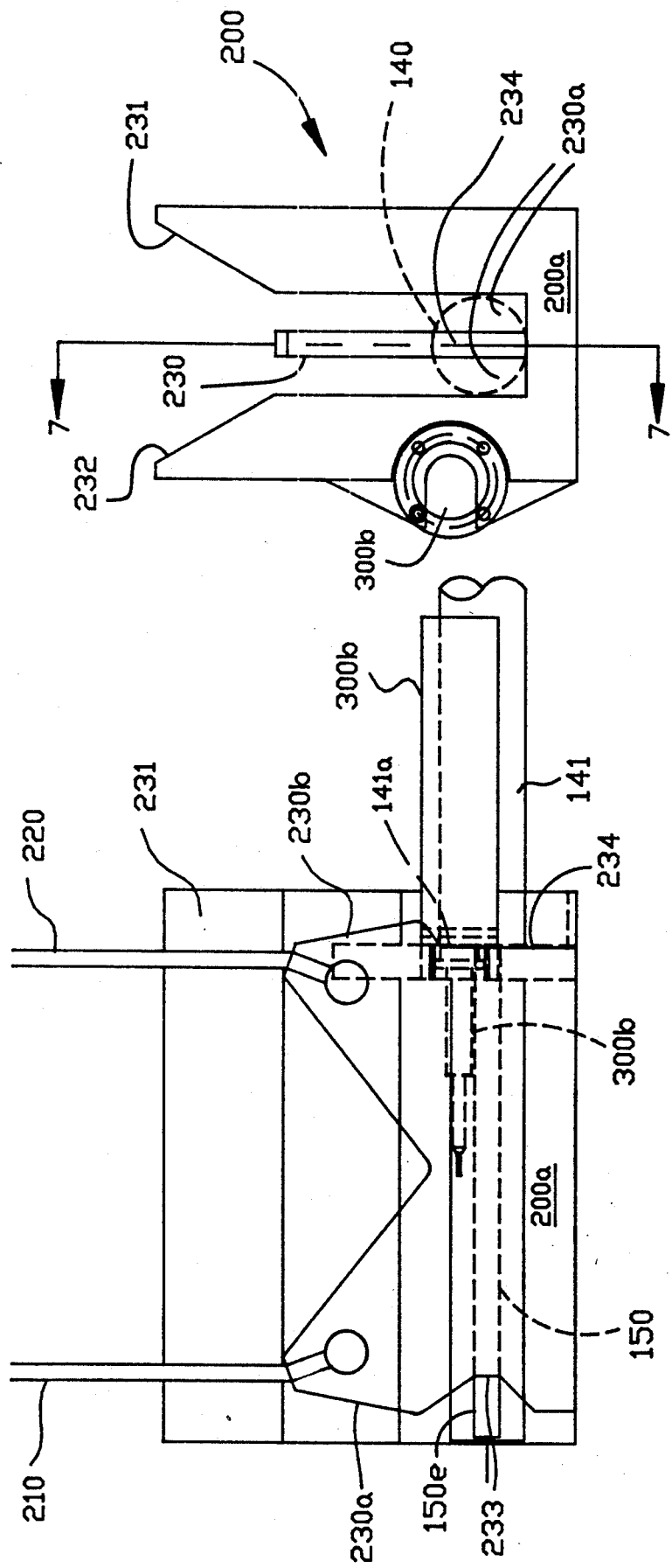
FIG. 6 shows an end view of the target block of the docking or target assembly showing only the female part of a coupling.
FIG. 7 shows a side view, partially in cross section of the target block of the docking or target assembly taken generally along lines 7—7 in FIG. 6.

Referring to FIGS. 5, 6 and 7, target assembly 200 has two vertically extending cables 210 and 220 and submersible vehicle V acquires a visual contact with instrumentation target IT. Vehicle V is maneuvered into a position so that the extended inner and outer arms 125 and 140 and opened pair of grabber arms 150 locates the now separated slot 150' of pair of grabber arms 150 to a position that straddles the two wire cables 210 and 220, see FIG. 4. Now, stepper motor 110 is actuated to reverse the direction of rotation of lead screw 115 to start to close (converge) the separated pair of grabber arms 150 and to retract grabber arm assembly 100.

As stepper motor 110 continues to impart the reversed rotational motion to lead screw 115, follower nut 126 begins axial travel from right to left in FIG. 2 and the force of compression spring 127 causes inner arm 125 to move to the left, leaving outer arm 140 in a fully extended position. Since clevis 130 is secured to the end of inner arm 125, the grabber arms 150 begin to retract and cam lobes 150a are pulled away from camming surfaces 147a of wedge block 147. A tongue portion 150c of each of the pair of grabber arms 150 is forced against the bottom of a pair of diametrically opposed slots 145 provided in the end 141 of outer arm 140. As clevis 130 continues to move to the left in the drawings in response to appropriate rotation of stepping motor 110, the mechanical coaction between the bottom of slots 145 and the surface of tongue 150c causes the grabber arms to pivotally close about wire cables 210 and 220 to secure them within the confines of slot 150'.

Immediately after closure of the grabber arm stepper motor 110 is stopped. Submersible vehicle V now is appropriately controlled to thrust downward or sink by negative ballasting so that grabber arms 150 slide downwardly toward target assembly 200 along wire ropes 210 and 220 which are captured in slot 150' toward a nestling fitting between grabber arm assembly 100 and target assembly 200, see FIG. 5a.

Wire cables 210 and 220 are attached to target assembly 200 at an interface plate 230, see FIG. 6, which shows an end view of target assembly 200 and FIG. 7. FIG. 5b shows grabber arm assembly 100 nestled in target assembly 200 with interface plate 230 within slot 150' of the closed grabber arms 150.

As grabber arms 150 slide downwardly toward a target block of target assembly 200 along wire ropes 210 and 220. Target block 200a is provided with an interface plate 230 shaped with inclined surfaces 230a and 230b which is centered between tapered lead-in edges 231 and 232. A pair of locating slots 230a is machined in the target block to accommodate the dimensions of pair of grabber arms 150 . Pair of grabber arms 150 continues its downward motion to straddle interface plate 230 in slot 150' and to slide down to come to rest in a nestling position in the bottom of locating slots 230a. When this nestling relationship reached, a further rotation by stepping motor 110 further retracts follower nut 126 and the interconnected inner arm 125 and outer arm 140. This causes the transmission of a pulling force from the closed pair of grabber arms 150 to interface plate 230 of target assembly 200 grabber arm to engage a bearing surface of notch 234 in interface plate 230. Further rotation of stepper motor 110 further retracts grabber arm assembly 100 until tines 150e of grabber arms 150 seat in a notch 233 of interface plate 230 and an end 141a of outer arm 140 seats against another bearing surface of notch 234 of interface plate 230, see FIG. 5b. At this time the target assembly is captured by the grabber arm assembly.

Since a female connector 300b is rigidly attached to target assembly 200 of instrumentation target IT and a mating male body connector 300a is rigidly mounted on submersible vehicle V, a mere further retraction of grabber arm assembly 100 into submersible vehicle V by appropriate rotation is all that is needed to interconnect the two aligned male and female body connectors. This relative simplicity of coupling, as well as uncoupling by mere reversal of the stepping motor, is due to the mounting of the mating parts of the underwater matable fiber optic, electrical or fluid connectors in their respective locations in such a manner as to be aligned when the target assembly is completely captured by the grabber arm assembly. As a consequence, as the grabber arm assembly is further retracted, the coupling of the underwater matable male and female connector portions 300a and 300b is simplified. The completion of the coupling is verified at the console located at the surface vessel sv by observing the signal through the interconnection.

The docking procedure between grabber arm assembly 100 and target assembly 200 is performed by maneuvering a pair of grabber arms 150 into a position so as to straddle two wire ropes 210 and 220. Stepper motor 110 then is commanded to turn lead screw 115 in a direction that would cause grabber arm assembly 100 to retract. As the stepper motor starts to turn, the force of the compression spring causes inner arm 125 to move, leaving outer arm 140 in the fully extended position. As pair of grabber arms 150 start to retract, cam lobes 150a pull away from wedge block 147 and tongue 150c of each grabber arm is pushed on by the bottom of its respective slot 145 in the end of outer arm 140, causing pair of grabber arms 150 to pivotally close about the two wire ropes. Each grabber arm has a tine 150e at its extreme end which overlaps each other and therefore keeps the two wire ropes within slot 150' between the grabber arms.

Immediately after closure of the pair of grabber arms 150, stepper motor 110 is stopped. Vehicle V is now thrust downward causing pair of grabber arms 150 to slide down wire ropes 210 and 220 to docking or target assembly 200. The wire ropes are attached to the target assembly at interface plate 230 which is an integral part of a target block 200a of target assembly 200. Interface plate is centered in locating slots 230a which have tapered lead-in edges 231 and 232. Pair of grabber arms 150 slide down over interface plate 230 and come to rest in the bottom of locating slots 230a. Stepper motor 110 then is operated to retract grabber arm assembly 100 until the grabber arms' tines 150e seat in tine bearing surface or notch 233 of interface plate 230, and the end 141a of outer arm 140 seats against the other end 234 of interface place 230. At this time target assembly 200 is completely captured by the grabber arm assembly 100. Coupling of the connector male and female parts 300a and 300b is in accordance with the procedure described above.

It is understood that the example stated is but one type of connection and that the present invention is intended to cover any type of connection that may be performed with this type of mechanism, for example, an electrical connection, a fiber optic connection or a fluid connection, and to function to pass fluid or electrical information from the instrumentation target to the submersible vehicle or the connection could be just as a means for grabbing hold of the instrumentation target to hold the vehicle stationery or to pick up a target and move it to another location.

The decoupling of the target assembly from the target assembly merely calls for reversal of stepper motor 110. This causes arms 150 to extend. When the arm assembly is fully extended the vehicle may thrust upward off the target assembly. The stepper motor then may be turned to extend the arm assembly until the grabber arm spreads far enough to release the cable so that the vehicle is free to back away from the target assembly.

Although the arrangement discussed has concerned itself with the engagement of a pair of vertically extended buoyed cables, this concept lends itself to more than one cable extending in any orientation, it being understood that appropriate maneuvering and ballasting or deballasting may be relied upon to achieve the necessary motion of the underwater vehicle to achieve interconnection. Other dispositions of extension of the cables from instrumentation target may be selected to accommodate a particular application as will be apparent to one skilled in the art without departing from the spirit and scope of this inventive concept.

Mating of underwater vehicles such as that disclosed herein reduces the task from a three-dimensional challenge to a two-dimensional challenge. The submersible vehicle only needs to initially find the vertical cables and attach to them anywhere along their length. After attachment to the cables is made, the vehicle merely moves toward the target assembly knowing that alignment is guaranteed by the configuration of the grabber arm assembly and the target assembly. When mating connectors are used and strategically located the coupling is assured and automatic.

Obviously, many modifications and variations of the present invention are possible in the light of the above teachings. It is therefore to be understood that within the scope of the appended claims the invention may be practiced otherwise than specifically described.

I claim:

1. A mechanism allowing a submersible vehicle to attach to an instrumentation target to assure that a rigid data transfer interconnection can be made therewith comprising:
   a target assembly mounted on said instrumentation target having a pair of cables extending therefrom and a suitable mounting portion;
   a first part of a mating data transfer connector mounted adjacent said target assembly;
   a second part of a mating data transfer connector mounted on said submersible vehicle being configured to mate with said first part of said mating data transfer connector; and
   a grabber arm assembly disposed adjacent said second part of a mating data transfer connector having a pair of pivotable arms provided with a slot sized to contain said cables, extendable arm means pivotally coupled to said pivotable arms having a portion to effect the selective opening and closing thereof and means for extending and retracting said extendable arm means connected thereto, said means for extending and retracting said extendable arm means is selectably actuated to extend said extendable arm means to effect the pivotal opening of said pair of pivotable arms to receive said cables in said slot, then said means for extending and retracting said extendable arm means is selectably actuated to effect a retraction of said extendable arm means and to pivotally rotate said pair of pivotable arms to effect the closing of said pair of pivotable arms to a closed position to effect a containment of the received said cables in said slot, said closed position of said pair of pivotable arms restricts the motion of said submersible vehicle to one dimension toward a nesting position on said mounting portion on said instrumentation target, then when in said nesting position, said means for extending and retracting said extendable arm means is selectably actuated to effect a further retraction of said extendable arm means to effect the engaging of said suitable mounting portion by said pivotable arms to effect the coupling of said first part of a mating data transfer connector and said second part of a mating electrical, optical or fluid connector to assure data transfer interconnections between said submersible vehicle and said instrumentation target assembly.

2. A mechanism according to claim 1 in which the said suitable mounting portion of said target assembly includes a tine bearing surface and each of said pivotable arms of said grabber arm assembly is provided with a tine which closes said slot and engages said tine bearing surface when said extendable arm means are selectably actuated to effect said further retraction.

3. A mechanism according to claim 2 in which said suitable mounting portion of said instrumentation target assembly is provided with inclined and tapered surfaces on an interface plate having interface plate slots to guide and nestle said pivotal arms in said interface plate slots after said pivotable arms are in the pivotally closed position.

4. An apparatus according to claim 3 in which said means for extending and retracting said extendable arm means of said grabber arm assembly includes a lead screw interconnected to said pivotal arms to assure the responsive extension, opening and closing thereof.

5. An apparatus according to claim 4 in which said extendable arm means coupled to said pivotable arms includes an inner arm and an outer arm connected to said lead screw via a follower nut to impart said responsive extension, opening and closing thereof.

6. An apparatus according to claim 5 in which said means for extending and retracting said extendable arm means includes a stepper motor coupled to said lead screw and said inner arm and said outer arm are coaxially disposed with respect to each other.

* * * * *